Patented Feb. 11, 1941

2,231,370

UNITED STATES PATENT OFFICE 2,231,370

RUBBER CHLORIDE PAINT

Herbert J. Reid, Fair Lawn, N. J., assignor, by mesne assignments, to United States Rubber Company, New York, N. Y., a corporation of New Jersey No Drawing. Application July 15, 1938, Serial No. 219,355

5 Claims. (Cl. 260—727)

This invention relates to corrosion resisting paints and more particularly to rubber chloride paints.

An object of the present invention is to improve the characteristics of rubber chloride whereby to render it more suitable for use as a corrosion resistant paint. Heretofore rubber chloride has been plasticized with numerous high-boiling solvents, e. g. chlorinated diphenyl, tricresyl phosphate, dibutyl phthalate, etc., which eventually evaporate and leave the film in the brittle condition characteristic of unplasticized rubber chloride. In addition, such paints show very poor adhesion. Also it is known that ordinary rubber and rubber chloride are incompatible with each other, mixed solutions thereof being not homogeneous, having poor adhesion to metal, and not being very corrosion-resistant. Further, when drying oils are incorporated with chlorinated rubber, the paints while flexible have greatly reduced corrosion resistance. To obviate these disadvantages it is a further object of the invention to provide a chlorinated rubber composition which adheres tenaciously to clean surfaces, has permanent flexibility, has excellent resistance to wet heat, and which can be handled with greater ease than most chlorinated rubber paints.

In U. S. P. 1,745,533 to Gibbons and Binmore, there is disclosed a method of making a varnish which embodies depolymerized vulcanized rubber, further vulcanized to ebonite in solution. The hardened depolymerized vulcanized rubber material will for the sake of simplicity be hereinafter referred to as "Vulcolac."

I have found that Vulcolac and rubber chloride are completely compatible or mutually soluble in all proportions both in solution and after the solvent has been removed, that is, the solution has no tendency to stratify upon standing, and dried films made therefrom are perfectly uniform in composition throughout, neither film-forming ingredient having any tendency to come to the surface or "sweat out."

Accordingly the invention relates to a coating composition comprising both rubber chloride and vulcanized rubber which has been depolymerized and thereafter further vulcanized in solution, together with an organic solvent. The composition may also optionally comprise pigments, photochemical inhibitors, corrosion inhibitors, etc. Dried films of such compositions exhibit excellent adhesion to metal surfaces; they are impervious to water, and thoroughly protect from corrosion metal surfaces to which they are applied; and they have sufficient elasticity to prevent cracking of the films under conditions such as paints are normally required to withstand, for instance, thermal expansion and contraction of metal structures. This elasticity is of a permanent nature due to the complete non-volatility and the stability of Vulcolac and presents a marked improvement over the usual plasticized rubber chloride films.

The rubber chloride-Vulcolac paint can be pigmented with various materials, in accordance with common practice. Lamp black has been found to be very satisfactory in my compositions for general use. The addition of aluminum powder to my composition gives paints which are remarkably resistant to the action of sunlight and weathering and are highly resistant to permeation by water vapor.

Wetting agents such as lecithin and zinc naphthenate have been found to be very effective in dispersing pigments in these paints.

Rust inhibitors may be added to advantage. For example, zinc chromate added to the lamp black pigmented paint resulted in superior resistance to corrosion when exposed to the weather in comparison with the same paint without zinc chromate.

The compatibility of chlorinated rubber with Vulcolac permits the incorporation of the two ingredients in my composition in any desired proportion, depending upon the qualities desired. The amount of Vulcolac should be at least sufficient to provide strong adhesion to the surfaces to which the paint is applied, and the amount of rubber chloride should be high enough to impart to the dried films the desirable chemical inertness characteristic of rubber chloride. In general, weight proportions varying from 30 parts of Vulcolac and 70 parts of rubber chloride, to 70 parts of Vulcolac and 30 parts of rubber chloride will be found suitable for most purposes. The preferred compositions, in which the desired properties are the most pronounced, comprise substantially equal weights of Vulcolac and rubber chloride.

The solvents employed may be any of the usual solvents for rubber chloride, solvent naphtha being particularly convenient because in commercial practice the "Vulcolac" is made in solvent naphtha solution.

The composition may be applied to surfaces by spreading, brushing, or spraying, as in the case of ordinary lacquers. Very good results are obtained by air-drying of the coatings. If desired, the coatings may be baked at elevated temperatures.

A composition suitable for use as a corrosion resistant paint, and which is representative of the preferred type, contains the following in which the parts are by weight:

| | |
|---|---|
| Chlorinated rubber | 50 |
| Vulcolac | 50 |
| Pigment | 30 |
| Wetting agent | 0.1 |

Sufficient solvent is added to give the desired viscosity.

The compositions may be applied as permanent protective coatings on surfaces generally, and particularly on wood and metal surfaces which may be subjected to the corrosive action of water, salt water, chemical fumes, and the like. Examples are pipes, conduits, flues, tanks, interior metal work and fittings, machinery, chemical equipment, the bottoms of boat hulls, and the like.

Having thus described my invention, what I claim and desire to protect by Letters Patent is:

1. A corrosion resistant paint comprising in an organic solvent chlorinated rubber and hardened depolymerized vulcanized rubber solution.

2. A corrosion resistant paint comprising in an organic solvent substantially equal proportions of chlorinated rubber and hardened depolymerized vulcanized rubber solution.

3. A corrosion resistant paint comprising in solvent naphtha solution substantially equal proportions of chlorinated rubber and hardened depolymerized vulcanized rubber solution.

4. An article coated with a flexible corrosion resistant protective layer resulting from drying a paint comprising in an organic solvent chlorinated rubber and hardened depolymerized vulcanized rubber in solution.

5. An article coated with a flexible corrosion resistant protective layer resulting from drying a paint comprising in an organic solvent substantially equal proportions of chlorinated rubber and hardened depolymerized vulcanized rubber in solution.

HERBERT J. REID.